United States Patent

Raman et al.

[11] Patent Number: 5,819,045
[45] Date of Patent: Oct. 6, 1998

[54] METHOD FOR DETERMINING A NETWORKING CAPABILITY INDEX FOR EACH OF A PLURALITY OF NETWORKED COMPUTERS AND LOAD BALANCING THE COMPUTER NETWORK USING THE NETWORKING CAPABILITY INDICES

[75] Inventors: Anant Raman; Sanjay Rungta, both of Chandler, Ariz.

[73] Assignee: Intel Corporation, Santa Clara, Calif.

[21] Appl. No.: 581,041

[22] Filed: Dec. 29, 1995

[51] Int. Cl.⁶ .................................................. G06F 13/00
[52] U.S. Cl. ................................ 395/200.56; 395/200.54; 395/675
[58] Field of Search .................... 395/200.01, 200.05, 395/200.09, 200.11, 200.15, 200.31, 200.38, 200.47, 200.63, 200.56, 200.54, 200.71, 675, 674; 364/281, 281.6, 975.5; 370/232, 233, 234

[56] References Cited

U.S. PATENT DOCUMENTS

| | | | |
|---|---|---|---|
| 4,771,391 | 9/1988 | Blasbalg | 364/514 |
| 5,377,327 | 12/1994 | Jain et al. | 395/200 |
| 5,535,335 | 7/1996 | Cox et al. | 395/200.11 |
| 5,539,659 | 7/1996 | Mckee et al. | 364/514 |
| 5,557,748 | 9/1996 | Norris | 395/200.1 |
| 5,572,674 | 11/1996 | Ernst | 395/200.01 |
| 5,598,532 | 1/1997 | Liron | 395/200.01 |
| 5,627,766 | 5/1997 | Beaven | 364/551.01 |
| 5,652,841 | 7/1997 | Nemirovsky et al. | 395/200.5 |
| 5,675,576 | 10/1997 | Kalampoukas et al. | 370/232 |

*Primary Examiner*—Mark H. Rinehart
*Attorney, Agent, or Firm*—Blakely, Sokoloff, Taylor & Zafman

[57] ABSTRACT

A method for determining a networking capability index (NCI), which is representative of the load a computer applies to a computer network. The method includes selecting a group of packet sizes, measuring the capability of the computer to transmit packets of each of the selected sizes from the process application to the input/output kernel as a function of time, and determining a probability distribution for the selected packet sizes, wherein the probability distribution for a selected packet size is representative of the percentage of total traffic corresponding to the selected packet size. The method then determines the NCI by summing the product of each selected packet size times each corresponding throughput value times each corresponding probability distribution value. Also a method for load balancing a plurality of networked computers arranged in segments by determining the NCI for each of the networked computers, and selectively connecting the computers to have approximately equal combined NCI values for all segments.

14 Claims, 7 Drawing Sheets

METHOD FOR DETERMINING A NETWORKING CAPABILITY INDEX FOR EACH OF A PLURALITY OF NETWORKED COMPUTERS AND LOAD BALANCING THE COMPUTER NETWORK USING THE NETWORKING CAPABILITY INDICES

BACKGROUND OF THE INVENTION

1. Field of the Invention

The invention generally relates to computer networks and in particular to techniques for load balancing computer networks.

2. Description of Related Art

Figure 1:
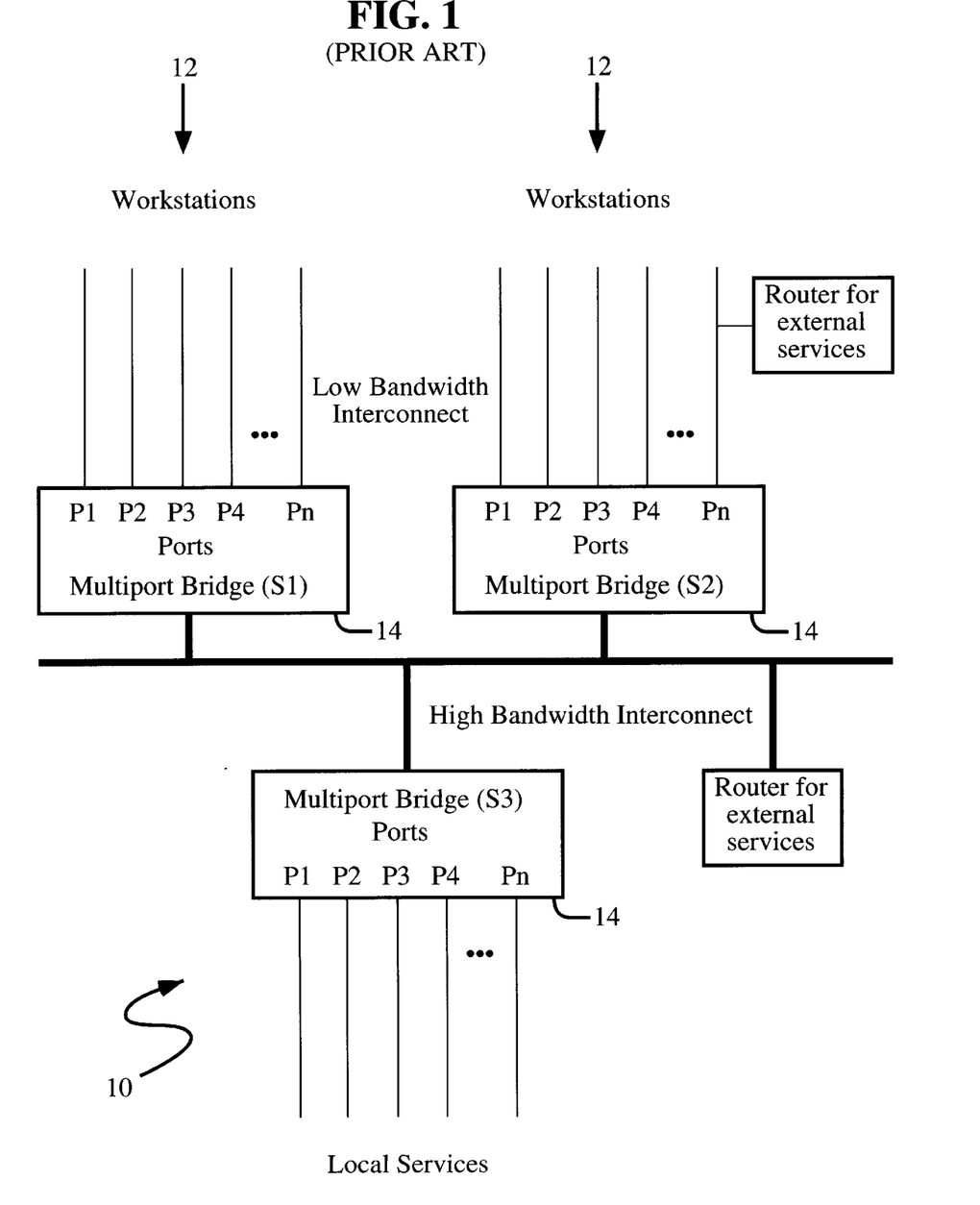
FIG. 1 is a block diagram illustrating a network topology of a computer network subject to improvement using the present invention.

State of the art computer networks often include a large number of computers, of differing types and capabilities, interconnected through various network routing systems, also of different types and capabilities. FIG. 1 illustrates a possible arrangement of a high performance computer network wherein a large number of workstations are interconnected through multiport bridges S (e.g., ethernet switches) and the multiport bridges are interconnected through high bandwidth networks (e.g., FDDI). Local and remote services include file servers, email and other directory services. The high bandwidth interconnects provide capacity to handle for multiple service requests.

The goals of network topology design are increased performance and low latencies. Typically, we provide increased performance with high bandwidth networks such as FDDI and ATM. Low latencies can be achieved by providing minimal networking components in the paths between the enduser workstations and the services. FIG. 1 also exemplifies the well-known Divide and Conquer method of load balancing. The network 10 is divided into sub-networks 12 using multiport bridges 14. Today's state of the art multiport bridges can transfer packets between its ports at the same speed of the networks they connect to with low latencies. It is found that the specific arrangement of the computers within the network can greatly affect the overall processing capabilities of the network and permits cost effective solutions such as using low bandwidth interconnects without compromising performance. Heretofore, however, no effective techniques have been developed for determining a proper arrangement or configuration for a computer network, such as the one illustrated in FIG. 1.

One problem with developing strategies for interconnecting computers within the network is that the computers themselves, both the workstations and the file servers, have widely different networking capabilities. "Networking capability" herein refers to the capability of a computer to transmit or throughput data onto a computer network and, to a lesser extent, the capability of a computer to receive or input data from a computer network. The networking capability of a computer, therefore, represents the load which the computer can apply to a computer network. Any strategy for interconnecting computers in an optimal fashion should account for differences in computer networking capabilities. Heretofore, however, no effective techniques have even been developed for determining or characterizing the networking capabilities of individual computers, let alone for utilizing such information to develop a strategy for interconnecting computers to yield an optimal computer network.

Traditional techniques for benchmarking computers, such as CPU operations per second capability, are not particularly helpful in context of computer networks. The mere fact that a computer CPU may be capable of performing a large number of operations per second does not indicate that the computer is capable of throughputting data onto a computer network with high data transmission rates. Indeed, the ability to throughput data on computer network appears to be influenced, in large part, by the operating system of computer which can also vary significantly in capability from computer to computer.

Figure 2:
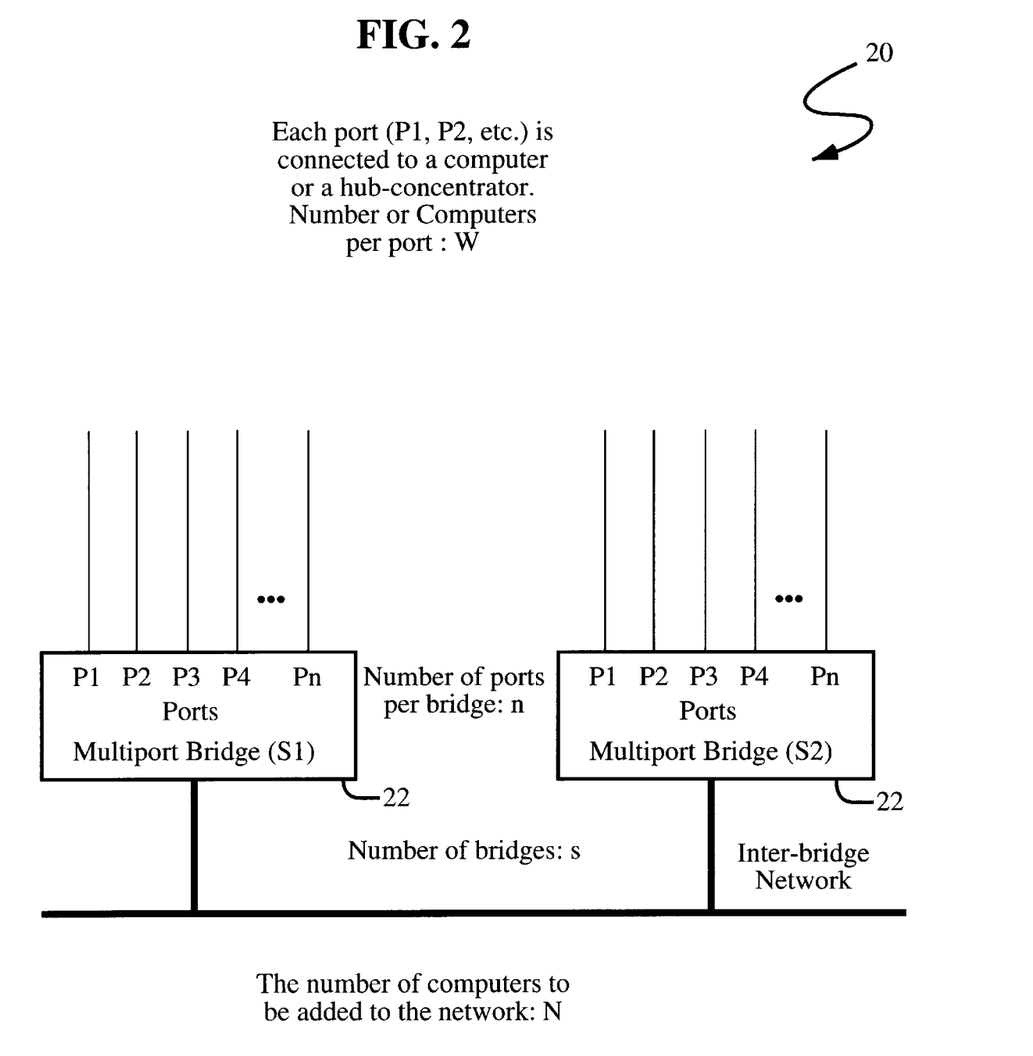
FIG. 2 is a block diagram illustrating a pair of multiport bridges interconnected by an inter-bridge network and illustrating the basic problems solved by the present invention.

Without a reliable technique for benchmarking the capability of computers to throughput data onto a computer network, strategies for arranging computers within a network have been very simple. FIG. 2 illustrates a computer network 20 having multiport bridges 22 and sets forth the basic problem statement to which the present invention applies.

A first common method of arranging N computers is to populate as many ports of the multiport bridges with the maximum number of the computers per port W. The total number of ports P needed are N/W or N/W+1. The total number of multiport bridges S needed is P/p or P/p+1, p being the number of ports per multiport bridge. This method results in unused ports, performance problems with loading each port to capacity, and inconsistent performance between the sub-networks connected to the multiport bridges.

A second common method of arranging computers starts with each subnetwork connected to the multiport bridges being at exactly half its capacity. In this case, the number of ports P requires is N/2W or N/2W+1 and the number of multiport bridges S required is P/p or P/p+1. This method will provide better performance than the first method, but is inherently more expensive because each port is only half populated. Also, performance between any two subnetworks may not be consistent as there is no effective load balancing based on individual computer's capabilities.

Accordingly, it would be desirable to provide an improved method for arranging computers with the computer network, particularly one having multiple multiport bridges, wherein load balancing is achieved. As noted above, one reason that conventional load balancing techniques typically adopt a rudimentary approach is that, heretofore, there has been no effective method for determining or gauging the load to which any particular computer places upon the network. Indeed, many computer network systems analysts may not have even realized that it would be possible or desirable to determine such a load value. Conventional computer benchmark values, such as CPU capability values, are not effective in determining the actual load a computer applies to the network. Accordingly, it would also be desirable to provide a method for benchmarking computers which provides a value representative of the load the computer may apply to a computer network. It is these ends that aspects of the present invention are drawn.

SUMMARY OF THE INVENTION

In accordance with one aspect of the invention, a method and apparatus is provided for determining a value representative of the load a computer applies to a computer network. The computer load value is determined by evaluating the maximum average capability of the computer to throughput data from a software process running within the computer to an input/output kernel also running within the computer. Herein, the load value is referred to as a "networking capability index" (NCI) as it provides a benchmark or index of the ability of the computer to throughput data onto a network. By equating the computer NCI with the process-to-kernel throughput value, the NCI is thereby substantially constant for a given combination of computer hardware and operating system software. In other words, the NCI does not vary from computer to computer depending upon the applications running on the computer or from computer to computer varying in accordance with the network to which the computer is connected. computer hardware/operating system combinations. Hence, once determined for a given hardware/operating system combination, the NCI may be applied to other similar computers without further recalculation.

In one embodiment, the NCI is determined by first selecting a group of data packet sizes "Si" where i=1 to N and N is the total number of selected packet sizes. Exemplary packet sizes may be 96 bytes, 256 bytes, 512 bytes, 1024 bytes and 1460 bytes. Next, the packet rate capability "$X_i$" of the computer to transmit packets of each selected packet i from an application process running on the computer to an input/output kernel also running on the computer is measured. The packet rate capability $X_i$ may be measured by running a standard data transmission program as the application process wherein the standard program merely repeatedly outputs data packets of the various selected sizes to the input/output kernel and determines the percentage of those packets subsequently forwarded onto the computer network by the input/output kernel. Next, a probability distribution "$P_i$" for the selected packet sizes is determined. The probability distribution represents the percentage of total traffic corresponding to each of the selected packet sizes. The probability distribution may specify, for example, that 50% of actual traffic flow within a practical computer network consist of packet sizes in the range of 64 to 127 bytes per packet and 30% corresponds to packet sizes in the range of 128 to 255 bytes per packet, etc. The probability distribution may be determined either by measuring actual traffic flow distribution for a computer connected to a computer network to be load balanced or by merely selecting default probability distribution values described herein. Finally, the NCI value for the computer is calculated by summing the product of the probability distribution value, the packet rate capability value, and the packet size value, for each of the selected packet sizes. The foregoing may be represented by:

$$NCI = 10^{-6} \sum_{i=1}^{N} 8P_i X_i S_i.$$

The resulting NCI value, which may be represented in terms of Mbps, represents a benchmark for the given computer for use in, for example, load balancing a computer network. As such, the NCI value need not be predetermined for each individual computer. Rather, it is sufficient that the NCI value be determined for each combination of computer and operating system software. For workstation computers of the type typically connected to computer networks, the operating system software is typically bundled with the computer, further simplifying the NCI benchmarking process. An examination of the NCI values for different computers reveals the capability of the computer to throughput data onto a computer network, i.e., the NCI identifies the maximum load to which a given computer applies to the computer network. As an example, one computer may have an NCI of 30 Mbps whereas another has an NCI of only 1.5 Mbps. Such indicates a significant difference in the maximum load applied by the respective computers to a computer network. This information in then employed to intelligently arrange computers within the computer network. For example, several computers all having high NCI values may be connected to different multiport bridges within the network to thereby distribute the load of those computers evenly over the computer network. Computers having lesser NCI value may be grouped with one having a larger NCI values within a particular subnetwork.

Thus, in accordance with the second aspect of the invention, a method for load balancing a computer network containing a group of computers for the network topology described in FIG. 1 is provided. Steps of the method include determining the NCI of each computer, the number of ports of the multiport bridge, and dividing the machines into groups each representing a subnetwork connected to the ports of the bridges with the criterion that the sum of the NCIs of all the computers per group is about equal across all the groups. The analysis continues with a comparison of the group NCI to the throughput of the port of the multiport bridge that the computers will be connected to. As an example, if the group NCI is 15 Mbps and the group is to be connected to an Ethernet port, then the Ethernet port will be underutilized. However, if the group NCI is about 50 Mbps and the group is to be connected to an Ethernet port, then the Ethernet port will not be underutilized. In the former case, it is easy to add more ports in the multiport bridge and the procedure can be repeated. At this time, more computers can be taken into consideration, such as due to future expansions or due to collapsing large number of small networks into a fewer number of larger networks. Hence, the NCI can be used to reduce overburdening of networks through load balancing, or using load balancing to consolidate small networks which were spread out for performance reasons.

Thus, NCI values can be helpful in developing a strategy for arranging computers within a network. The NCI values are also helpful in determining what additional resources may be required for expanding a computer network. Referring to FIG. 1, if the network has a large number of high NCI valued computers, the network will need a large number of ports for the multiport bridge, which then may result in the need to change the technology for the interconnect network from FDDI (100 Mbps) to ATM (155/622 Mbps). Another example is if a certain file server has an NCI value of 50 Mbps, an FDDI interface may be better suited than an Ethernet interface. Conversely, it would be wasteful to provide a dedicated ATM line to the computer with NCI value of 50. The use of NCI values may have yet other applications beyond those summarized above.

Thus, methods for determining a benchmark value representative of the load a computer applies to a network and methods for load balancing computers using such a load value have been provided. Accordingly, the general objectives set forth above have been achieved. Other objects, features and advantages of the invention will be apparent from the detailed description which follows and from the accompanying drawings.

EXEMPLARY EMBODIMENTS OF THE INVENTION

With reference to the remaining figures, exemplary embodiments of the invention will now be described. The exemplary embodiments are described primarily with reference to block diagrams and flowcharts. As to the flowcharts, each block within the flowcharts represents both the method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 3:
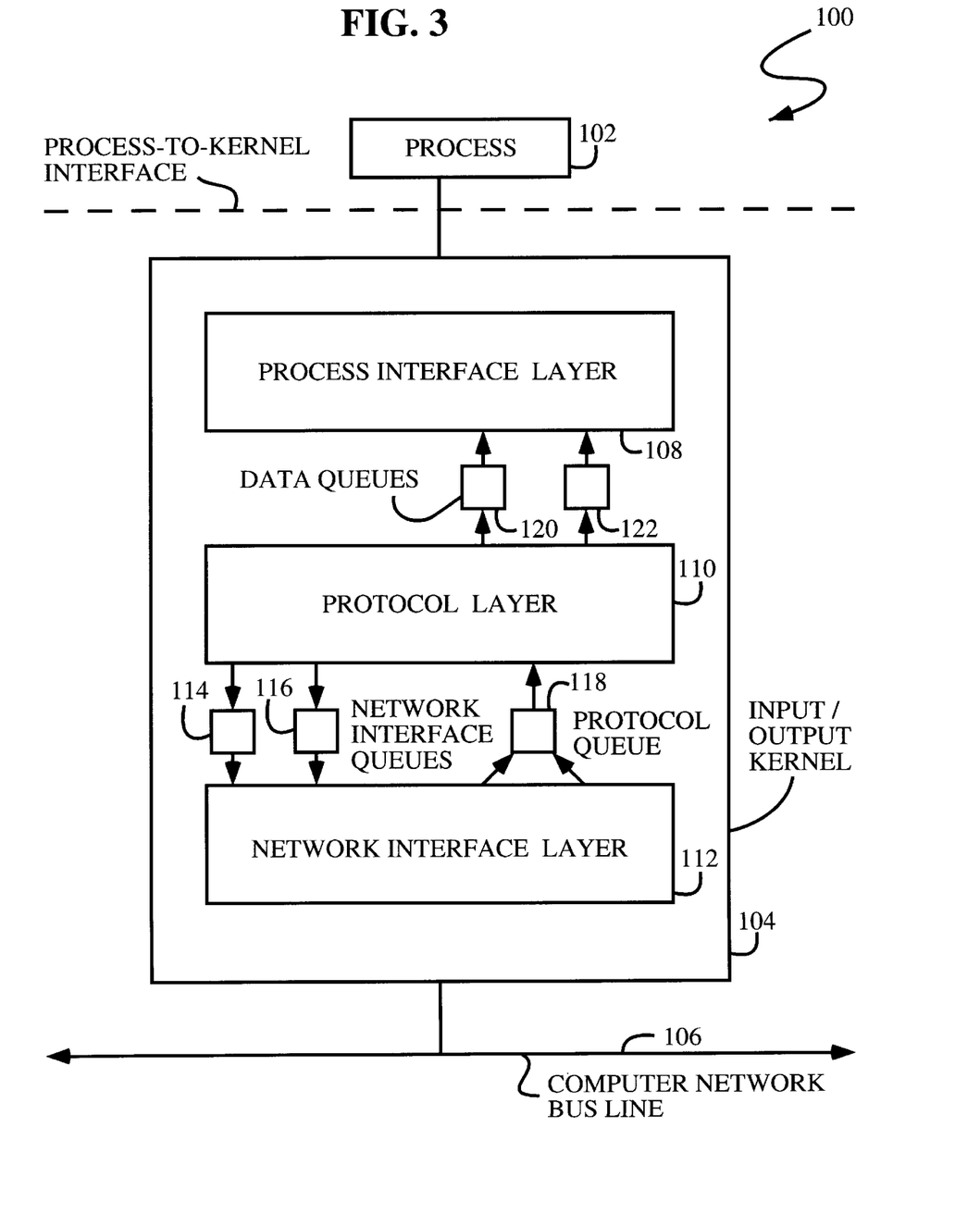
FIG. 3 is a block diagram of software entities within a computer subject to the calculation of a NCI value in accordance with the invention.
Figure 4:
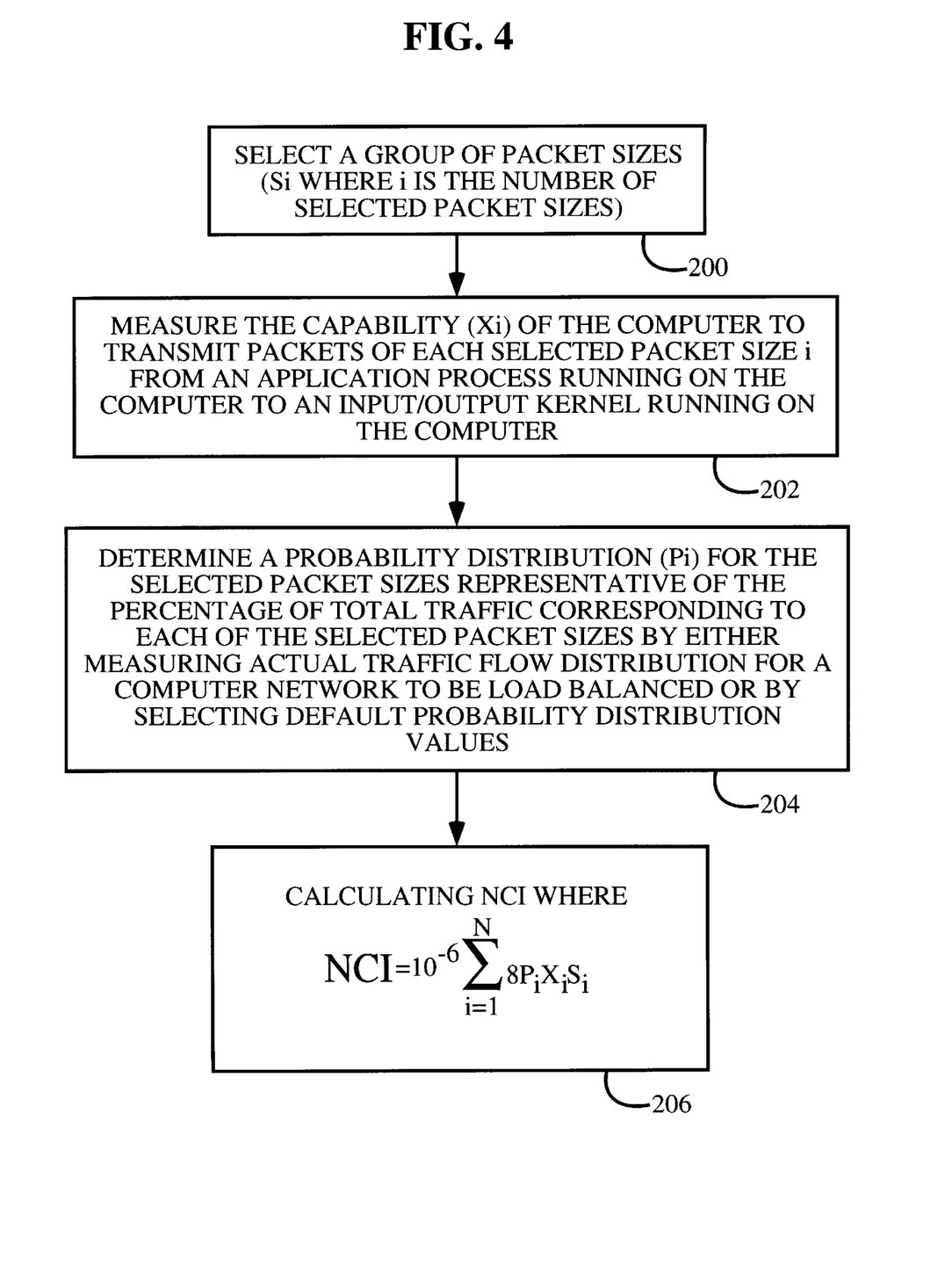
FIG. 4 is a flowchart illustrating a method for calculating an NCI value for the computer of FIG. 3.

With reference to FIGS. 3 and 4, a method for determining the NCI value for a particular computer will be described. Then, with reference to the remaining figures, a method for load balancing a computer network using NCI values will be described.

FIG. 3 illustrates a computer 100 in terms of software processes running within the computer. More specifically, computer 100 includes an application process 102 and an input/output kernel 104. Kernel 104 includes software components necessary for transmitting data, received from process 102, to an external computer network transmission line 106. More specifically, kernel 104 includes a process interface layer 108, a protocol layer 110 and a network interface layer 112. In use, data to be output from process 102 to the computer network via media 106 is communicated to process interface layer 108 by system calls. Software of process interface layer then communicates the data to the protocol layer by function calls. The protocol layer, which may represent any of the variety of computer network transmission protocols such as TCP and UDP, in turn communicates with the network interface layer via one or more network interface queues 114 and 116. The data is then asserted onto network line 106 by the network interface layer.

During the output process, each layer of the input/output kernel adds unique headers to the data such that the resulting data packets output onto line 106 may include a number of nested headers. To input data from line 106 to process 102, the various headers are sequentially stripped from the data packet until data only is transmitted from the process interface layer to the process. Transmission of data from line 106 to the process may be facilitated by a protocol queue 118 between the network interface layer and the protocol layer and one or more data queues 120 and 122 between the protocol layer and the process interface layer.

In general, it may be possible to gauge or measure the throughput of data between any of the various software components illustrated in FIG. 3.

However, in accordance with the invention, data throughput capability is measured only between the process 102 and process interface layer 108. In other words, the aforementioned NCI value, which is representative of the load a computer applies to a computer network, is determined solely based on the capability of a process running within the computer to throughput data into the process interface layer of an input/output kernel also running within the computer. Process to process interface layer throughput is chosen, in part, because such a throughput value does not significantly vary depending upon the computer network to which the computer is attached. Rather, the capability of the computer to throughput data from the process to the process interface layer depends only upon the computer itself including its microprocessor and operating system software. As such, a load value based upon process to process interface layer throughput represents a benchmark which varies only between different computers or between like computers having different operating systems.

FIG. 4 illustrates a method by which the throughput capability for transmission of data from the process to the process interface layer of the computer 104 may be determined and quantified in terms of the aforementioned NCI value.

Initially, at step 200, a group of packet sizes are selected. Herein, packet sizes are represented by $S_i$ where i=1 to N and N is the number of selected packet sizes. Exemplary packet sizes are $S_1$ equals 96, $S_2$ equals 256, $S_3$ equals 512, $S_4$ equals 1024 and $S_5$ equals 1460, where each S value is represented in bytes.

Next, at step 202, the capability of the computer to transmit packets of the selected sizes from application process 102 (FIG. 3) to the input/output kernel running on the computer 104 (also FIG. 3) is measured. Herein, the capability for packet $S_i$ is represented by $X_i$ wherein $X_i$ is represented in dimensions of packets per second. Capability values are determined by running a standard application process software program within the computer which merely attempts to output data of the various selected packet sizes to the input/output kernel of the computer. The standard program measures the number of packets successfully transferred to the input/output kernel per second. The success of the data packet transfer is determined by whether the input/output kernel returns a value indicating successful transference or not. The data transference program is preferably written in a portable and substantially uniform computer language such as C such that only minor modifications may be required to run the computer program on different computer systems.

Table I, below, illustrates actual measured packet rates (X) for five different packet sizes for each of fifteen computers.

TABLE I

| Machine Type | 96 (X1) | 256 (X2) | 512 (X3) | 1024 (X4) | 1460 (X5) |
| --- | --- | --- | --- | --- | --- |
| Computer A | 1422 | 1281 | 1211 | 1430 | 1544 |
| Computer B | 1418 | 1354 | 1422 | 1968 | 1989 |
| Computer C | 3448 | 2921 | 3606 | 4487 | 4470 |
| Computer D | 4757 | 3981 | 5264 | 6998 | 6824 |
| Computer E | 4335 | 2602 | 7569 | 9354 | 9325 |
| Computer F | 1950 | 1794 | 1622 | 2174 | 2319 |

TABLE I-continued

| Machine Type | 96 (X1) | 256 (X2) | 512 (X3) | 1024 (X4) | 1460 (X5) |
|---|---|---|---|---|---|
| Computer G | 1496 | 1411 | 2490 | 3260 | 3341 |
| Computer H | 2788 | 2577 | 2740 | 3723 | 3786 |
| Computer I | 5987 | 5388 | 5733 | 7234 | 6929 |
| Computer J | 11176 | 9348 | 9163 | 11688 | 10501 |
| Computer K | 526 | 473 | 775 | 683 | 650 |
| Computer L | 706 | 627 | 1195 | 1139 | 1137 |
| Computer M | 2836 | 2552 | 2681 | 2362 | 2061 |
| Computer N | 2946 | 2713 | 3816 | 4287 | 2731 |
| Computer O | 4258 | 4195 | 4796 | 4863 | 3794 |

As can be seen from Table I, data transference rates $X_i$ vary significantly from machine to machine for a given packet size and from packet size to packet size for a given machine.

At step 204, a probability distribution $P_i$ for the selected packet sizes is determined. The probability distribution represents the expected percentage of total traffic corresponding to each of the selected packet sizes. The probability distribution is intended to apply a "real world" weight factor to the data transmission rate X to account for the fact that, in practical implementations, more data packets of one size may be transmitted than the data packet of another size. By using a "real world" probability, computer system capable of achieving high data throughput only at certain selected data packet rates will not be receive an unduly high NCI value.

Table II illustrates exemplary probability distribution values Pi for various packet size ranges. The probability values are represented both in percentage values and in values normalized to 1.0.

TABLE II

| Variables | Packet Range | % of Traffic | Probability Distribution |
|---|---|---|---|
| P1 | 64–127 | 50 | 0.5 |
| P2 | 128–255 | 30 | 0.3 |
| P3 | 256–511 | 2 | 0.02 |
| P4 | 512–1023 | 5 | 0.05 |
| P5 | 1024–1518 | 13 | 0.13 |

As can be seen from Table II, packet sizes in the range from 64 to 127 bytes comprise 50% of the network traffic. Packet sizes of 256 to 511 bytes comprise only 2% of network traffic.

The probability distribution values, determined at step 204, may be either determined by measuring actual traffic flow distribution for a computer network to which computer 100 is connected or by merely employing default probability distribution values. Table II represents probability distribution values actually measured for a computer connected to a test network. However, the values measured for the test network, as illustrated in Table II, can also act as default values for use in evaluating the NCI for computers to be connected to other networks. In this regard, it is not anticipated that the probability percentage values will differ significantly for a given computer connected to different computer networks.

Finally, at step 206, the NCI value for the computer is calculated by summing the product of the probability values, the throughput capability values and the group packet sizes for each of the selected packet sizes. The foregoing may be represented by the following equation:

$$NCI = 10^{-6} \sum_{i=1}^{N} 8P_i X_i S_i.$$

Exemplary NCI values, represented in Mbps, for each of the machines illustrated in Table I are set forth in Table III.

TABLE III

| Machine Type | Network Capability (Mbps) | Normalized NCI | CPU Equivalence |
|---|---|---|---|
| Computer A | 4.1603 | 0.5416 | 0.54 |
| Computer B | 5.0726 | 0.6604 | 0.78 |
| Computer C | 11.4815 | 1.4948 | 1.00 |
| Computer D | 17.1010 | 2.2265 | 1.46 |
| Computer E | 20.8605 | 2.7160 | 2.38 |
| Computer F | 6.0992 | 0.7941 | 0.79 |
| Computer G | 7.6805 | 1.0000 | 1.00 |
| Computer H | 9.6816 | 1.2605 | 1.19 |
| Computer I | 18.6568 | 2.4291 | 1.53 |
| Computer J | 30.0576 | 3.9134 | 2.43 |
| Computer K | 1.7383 | 0.2263 | 0.67 |
| Computer L | 2.8106 | 0.3659 | 1.21 |
| Computer M | 6.6504 | 0.8658 | 0.45 |
| Computer N | 8.5958 | 1.1191 | 1.00 |
| Computer O | 11.7855 | 1.5344 | 1.50 |

As can be seen from Table m, there is a wide range of NCI values ranging from about 1.7 up to about 30.1 indicating a wide range of throughput capabilities. Table III also provides a normalized NCI value normalized to the NCI of the computer G. Table III also provides CPU equivalence values normalized to the computer G. The CPU equivalence value is a standard value representative of the capability of the CPU of the computer to perform operations. As can be seen, there is only a partial correlation between CPU equivalence values and normalized NCI values indicating that computers with fast CPUs do not necessarily provide faster throughput to a computer network and vice versa. For example, the computer L has a normalized CPU equivalence value of 1.21 but has an NCI value of only 0.3659.

Information of the type provided in Table III may be used for load balancing a computer network or for making intelligent decisions regarding selection of hardware components. For example, in choosing a computer to operate as a file server, it is desirable to select a computer having a high NCI value. The same is true for selecting computers for applications expected to involve significant computer network access. Likewise, if several computers are already available, NCI information helps a system analyst to decide which of the computers should be used for different applications such as which should be used as a file server and which should be used as end user workstations.

Figure 5:
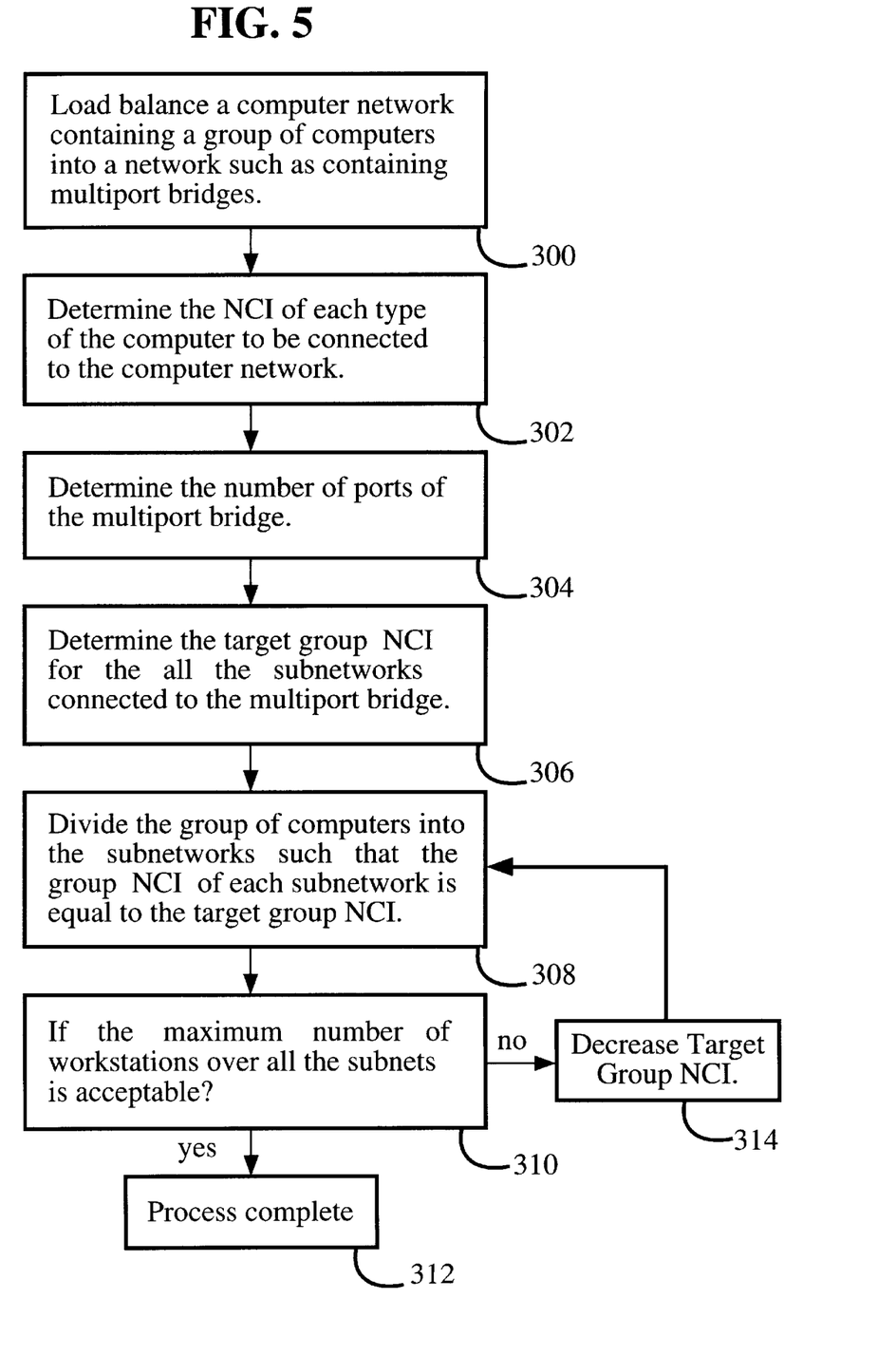
FIG. 5 is a flowchart illustrating a method for load balancing a computer network utilizing NCI values determined using the method of FIG. 4.

With reference to the remaining figures, methods for utilizing the NCI values for load balancing a computer network will now be described. First, with reference to FIG. 5, a method for load balancing a network computer 300 will be summarized. The first step 302 includes the determination of the NCI of the types computers that will be connected to the network. In this example, NCI is implied as the value relative to the standard machine. The second step 304 is to determine the number of ports of the multiport bridge required to support the workstations. An important piece of information is the port availability of the bridge product chosen. State of the art multiport bridges offer ports in multiples of 8 or 10 with a specified maximum. Assuming ten as the base unit of port offering, the best case scenario of number of ports per multiport bridge in FIG. 1 is 10, with Ethernet as the low bandwidth network and FDDI as the high bandwidth network. The third step 306 is to determine the target group NCI of each of the ten subnetworks that will be connected to the ports of the multiport bridge. The group NCI depends upon the environment. Let us assume that the target Group NCI is fifteen. The fourth step 308 is then to divide the workstations among the ten subnetworks such as that all group NCIs is equal to the target group NCI and determine the maximum number of computers in these ten subnetworks. If the maximum number of computers is acceptable, step 310, that is, there is sufficient hardware to connect all the machines today and for future expansion, the process is complete, step 312. If not, then decrease the target NCI by an amount representative of the NCI population, step 314, and go back to step 308.

The NCI of a network containing multiport bridges is the group NCI of any one of the subnetworks assuming that the networks have been load balanced based on NCI. For example, the NCI of a network with 60 computers is 120. With a total of eight subnetworks and no NCI load balancing, there would have 8 computers per subnetwork. With NCI load balancing, the number of computers per subnetwork depends on the NCI of the computers. In this example, the average NCI of a computer is two indicating that the network contains computers with rather high networking capability. The distribution of the NCI values among the computers alone will determine the composition of the network.

Figure 6:
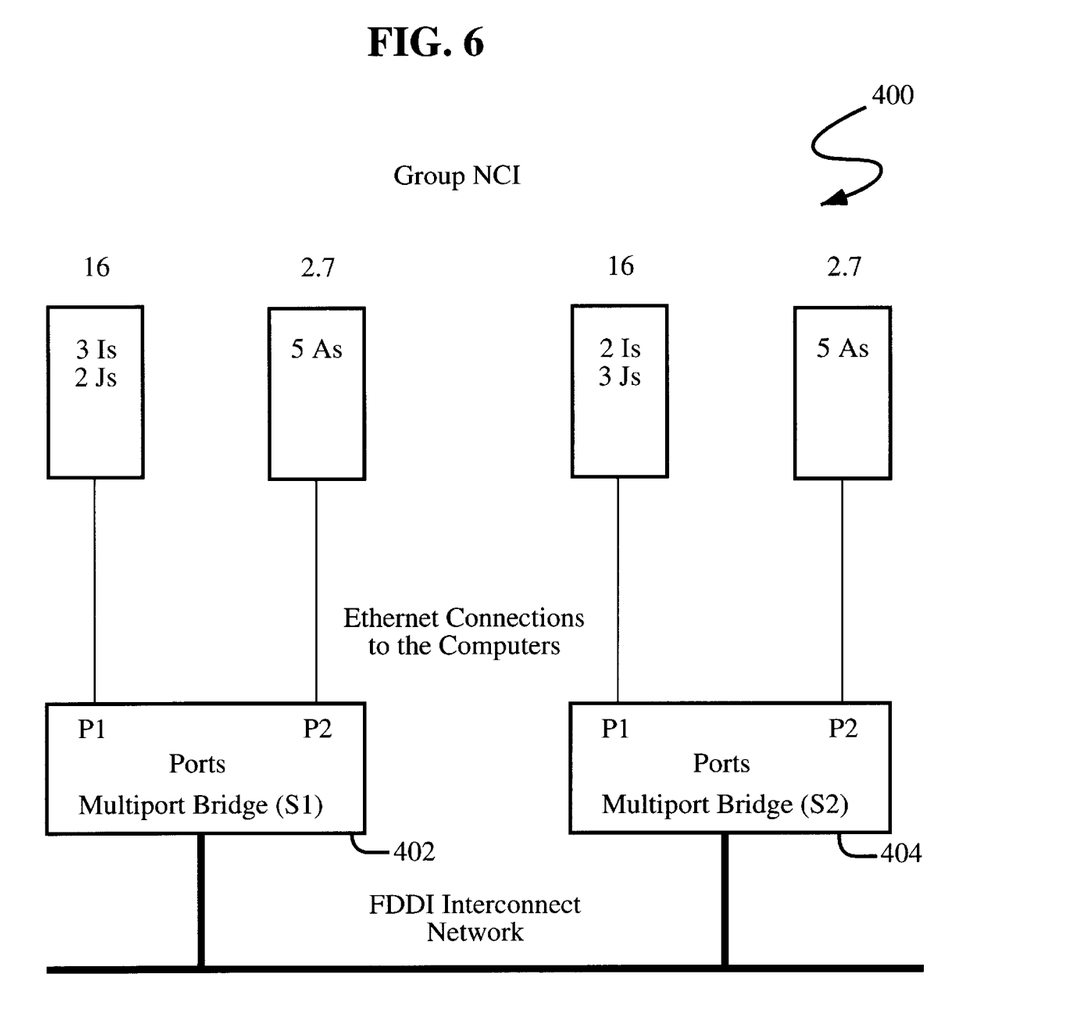
FIG. 6 is a block diagram of a computer system, similar to that of FIG. 1, but wherein computers are arranged using one of the conventional methods described in the Description of Related Art; this method does not use load balancing.
Figure 7:
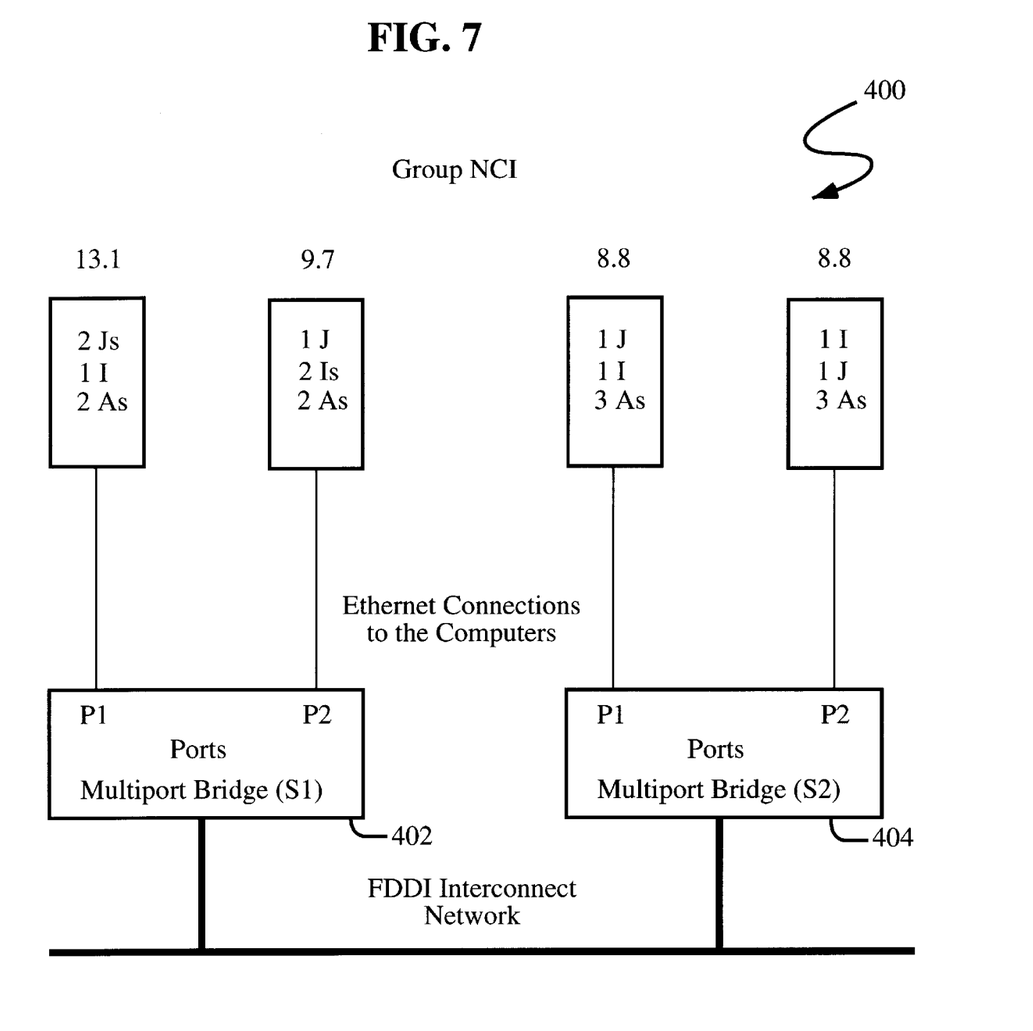
FIG. 7 is a block diagram of a computer network, similar to that of FIG. 6, having multiport bridges of different capabilities and wherein load balancing is achieved using NCI values to ensure that the combined NCI for each respective subnetwork equal and each port of multiport bridge is fairly well utilized.

Assume a computer network with five computers of type J, five machines of type I and ten machines of type A (based on Table III). The total NCI of all the computers in the network is 40 resulting in the average NCI of 2. Assuming that the multiport bridge of choice has two Ethernet ports and one FDDI port and each subnetwork can have a maximum of five computers. This results in a requirement for two multiport bridges. FIG. 6 illustrates an unbalanced network 400. Bridge S1 (402) contains two computer Js, 3 computer Is and five computer As with the five computer As connected to the second port. Bridge S2 (404) contains three computer Js, two computer Is and five computer As with the five computer As connected to the second port. All subnetworks have equal number of machines. The group NCIs are 16 for port 1 of bridge S1, 2.7 for port 2 bridge S1, 16 for port 1 bridge S2 and 2.7 for port 2 bridge S2. FIG. 7 illustrates the same network now balanced using NCI. The group NCIs are 13.1 for port 1 bridge S1, 9.7 for port 2 bridge S1, 8.8 for port 1 bridge S2 and 8.8 for port 2 bridge S2. The subnetwork connected to port 1 bridge S1 appears to be more "loaded" than the others, creating a possible anomaly. In reality, what keeps the balance is the number of computers in this case as the difference between this subnetwork and the rest is the presence of one extra high NCI computer. Practical cases have shown that one to two extra very high NCI machines does necessarily not cause load imbalances. Typically, differences of five to six high NCI machines produce load imbalances.

What has been described are techniques for determining values representative of the capability of a computer to throughput data onto the computer network and techniques for utilizing other information to arrange the computer network or to select components for computer network. These techniques have been described with reference to flowcharts and block diagrams illustrating exemplary implementations. These implementations are merely intended to be illustrative of principles of the invention and should not be construed as limiting the scope of the invention.

What is claimed is:

1. A method for determining a value representative of the load a computer applies to a computer network, said method comprising the steps of:

selecting a group of packet sizes;

measuring the capability of the computer to transmit packets of each selected packet size from the process application to the input/output kernel as a function of time;

determining a probability distribution for the selected packet sizes, said probability distribution representative of a percentage of total traffic from the computer corresponding to each of the selected packet sizes; and determining a networking capability index (NCI) for the computer based at least in part on said measured capabilities as a function of time for the selected packet sizes, said probability distribution for the selected packet sizes, and the selected packet sizes.

2. The method of claim 1 wherein the step of determining the networking capability index for the computer comprises the step of calculating:

$$NCI = 10^{-6} \sum_{i=1}^{N} 8P_i X_i S_i$$

wherein N is a number of selected packet sizes, $P_i$ is a traffic probability distribution value for the ith selected packet size, $X_i$ is the measured packet rate value for the ith selected packet size, and $S_i$ is the packet size for the ith selected packet size.

3. The method of claim 2 wherein the probability distribution values are determined by:

measuring the distribution of traffic corresponding to the selected packet sizes within the computer network.

4. The method of claim 1 wherein the probability distribution values are determined by:

setting the traffic probability distribution values to a set of default values.

5. The method of claim 4 wherein five packet sizes are selected, having packet sizes of 96, 256, 512, 1024 and 1460 bytes per packet, respectively, and wherein the corresponding probability distribution values are about 0.5, 0.3, 0.02, 0.05, and 0.13, respectively.

6. A method for load balancing a plurality of networked computers arrangeable in separate segments, said method comprising the steps of:

determining a networking capability index (NCI) for each of said computers said NCI representative of a maximum expected throughput capability for a computer for transmitting from an application process running within the computer to an input/output kernel also running within the computer; and selectively connecting said computers within said segments yielding segments having approximately equal combined NCIs for all computers connected thereto.

7. The method of claim 6 wherein the step of determining the NCI comprises the steps of:

selecting a group of packet sizes;

measuring the capability of the computer to transmit packets of each selected packet size from the process application to the input/output kernel as a function of time;

determining a probability distribution for the selected packet sizes, said probability distribution representative of a percentage of total traffic from the computer corresponding to each of the selected packet sizes; and determining the networking capability index (NCI) for the computer based at least in part on said measured capabilities as a function of time for the selected packet sizes, said probability distribution for the selected packet sizes, and the selected packet sizes.

8. The method of claim 6 wherein the step of determining the NCI for the computer comprises the step of calculating:

$$NCI = 10^{-6} \sum_{i=1}^{N} 8P_i X_i S_i$$

wherein N is a number of selected packet sizes, $P_i$ is a traffic probability distribution value for the ith selected packet size, $X_i$ is the measured packet rate value for the ith selected packet size, and $S_i$ is the packet size for the ith selected packet size.

9. The method of claim 7 wherein the probability distribution values are determined by:
    measuring the distribution of traffic corresponding to the selected packet sizes within the computer network to be load balanced.

10. The method of claim 7 wherein the probability distribution values are determined by:
    setting the traffic probability distribution values to a set of default values.

11. The method of claim 10 wherein five packet sizes are selected, having packet sizes of 96, 256, 512, 1024 and 1460 bytes per packet, respectively, and wherein the corresponding probability distribution values are about 0.5, 0.3, 0.02, 0.05, and 0.13, respectively.

12. A method for load balancing a computer network containing a plurality of multiport bridges and a group of computers, said method comprising the steps of:
    determining a networking capability index (NCI) for each of a plurality of types of computers to be connected to the computer network, said NCI representative of a maximum expected throughput capability for a type of computer for transmitting from an application process running within the type of computer to an input/output kernel also running within the type of computer;
    determining the number of ports of the plurality of multiport bridges;
    determining a target group NCI for all of a plurality of subnetworks connected to the multiport bridges;
    dividing the group of computers into subnetworks with the computers divided to achieve a group NCI of each subnetwork substantially equal to the target group NCI; and
    determining whether the maximum number of workstations over all of the subnetworks is acceptable and, if not, decreasing the target group NCI until the maximum number of workstations over all of the subnetworks is acceptable.

13. The method of claim 12 wherein the step of determining whether the maximum number of workstations over all of the subnetworks is acceptable is achieved by determining whether there is sufficient hardware to connect all of the computers to the network.

14. The method of claim 12 wherein the step of determining whether the maximum number of workstations over all of the subnetworks is acceptable is achieved by determining whether there is sufficient hardware to connect all of the computers while also allowing for any expected future expansion requiring additional computers.

* * * * *